United States Patent
Pitio et al.

(10) Patent No.: US 8,958,192 B2
(45) Date of Patent: Feb. 17, 2015

(54) CIRCUIT BREAKER

(75) Inventors: Walter Michael Pitio, Morganville, NJ (US); Allen Francis Santamaria, Staten Island, NY (US)

(73) Assignee: Cedarwood Technologies, Inc., McKinney, TX (US)

( * ) Notice: Subject to any disclaimer, the term of this patent is extended or adjusted under 35 U.S.C. 154(b) by 0 days.

(21) Appl. No.: 13/484,429

(22) Filed: May 31, 2012

(65) Prior Publication Data

US 2012/0242429 A1     Sep. 27, 2012

Related U.S. Application Data

(63) Continuation of application No. 12/716,448, filed on Mar. 3, 2010, now Pat. No. 8,203,816.

(51) Int. Cl.
*H01H 9/16* (2006.01)
*G01D 13/00* (2006.01)

(52) U.S. Cl.
CPC ........................................ *G01D 13/00* (2013.01)
USPC ........................................................ 361/93.1

(58) Field of Classification Search
CPC .......... H01H 9/16; H01H 9/161; H01H 37/08
USPC ........................................ 361/117, 216, 93.1
See application file for complete search history.

(56) References Cited

U.S. PATENT DOCUMENTS

| | | | | |
|---|---|---|---|---|
| 3,573,556 | A * | 4/1971 | Zocholl | 361/102 |
| 5,073,724 | A * | 12/1991 | Fox | 327/74 |
| 5,432,491 | A | 7/1995 | Peter et al. | |
| 5,473,495 | A | 12/1995 | Bauer | |
| 6,788,508 | B2 * | 9/2004 | Papallo et al. | 361/64 |
| 7,403,015 | B2 | 7/2008 | Carlino et al. | |
| 7,498,913 | B2 * | 3/2009 | Kawamura et al. | 335/145 |
| 7,936,142 | B2 * | 5/2011 | Otsuka et al. | 318/599 |
| 2004/0114295 | A1 | 6/2004 | Kim | |
| 2005/0103613 | A1 | 5/2005 | Miller | |
| 2006/0221528 | A1 * | 10/2006 | Li et al. | 361/100 |
| 2011/0214599 | A1 | 9/2011 | Pitio et al. | |

OTHER PUBLICATIONS

PIC Microcontrollers, 2003, MicroElectronica, pp. 1-2.*
Patel, Dharti Haridas, "U.S. Appl. No. 12/716,448 Notice of Allowance Mar. 14, 2012", , Publisher: USPTO, Published in: US.
Patel, Dharti Haridas, "U.S. Appl. No. 12/716,448 Office Action Oct. 19, 2011", , Publisher: USPTO, Published in: US.

* cited by examiner

*Primary Examiner* — Zeev V Kitov
(74) *Attorney, Agent, or Firm* — Kaplan Breyer Schwarz & Ottesen, LLP (57) ABSTRACT

A circuit breaker is disclosed that provides a warning that the current through the circuit breaker exceeds a warning threshold. The circuit breaker comprises: a switch that carries a current I; an indicator for alternatively indicating: (i) that the current I has not exceeded $I_W$, and (ii) that the current I has exceeded $I_W$; and an actuator in series with the switch that: (i) causes the indicator to indicate that the current I has exceeded $I_W$ when and only when the current I has exceeded $I_W$, and (ii) opens the switch when and only when the current I exceeds $I_T$; wherein $0 < I_W < I_T$.

20 Claims, 6 Drawing Sheets

CIRCUIT BREAKER

REFERENCE TO RELATED APPLICATIONS

This application is a continuation of prior U.S. application Ser. No. 12/716,448, filed Mar. 3, 2010.

FIELD OF THE INVENTION

The present invention relates to electrical circuits in general, and, more particularly, to circuit breakers.

BACKGROUND OF THE INVENTION

The overloading of an electrical circuit is dangerous and can cause a fire.

One mechanism in the prior art for preventing an electrical circuit from overloading is a "fuse." A fuse is a conductor that is placed in series with the electrical circuit that it protects. When the current through the fuse exceeds a threshold, the fuse heats up, burns, and opens the circuit. This protects the circuit and prevents a fire. A fuse is disadvantageous, however, in that it cannot be reused.

A second mechanism in the prior art for preventing an electrical circuit from overloading is a "circuit breaker." A circuit breaker is an electro-mechanical apparatus that is placed in series with the electrical circuit that it protects. When the current through the circuit breaker exceeds a threshold, a switch in the circuit breaker is opened. The opening of the switch opens the circuit, stops current from flowing, and prevents a fire. The circuit breaker is advantageous because the switch can be closed and the circuit breaker can be reused.

Figure 1:
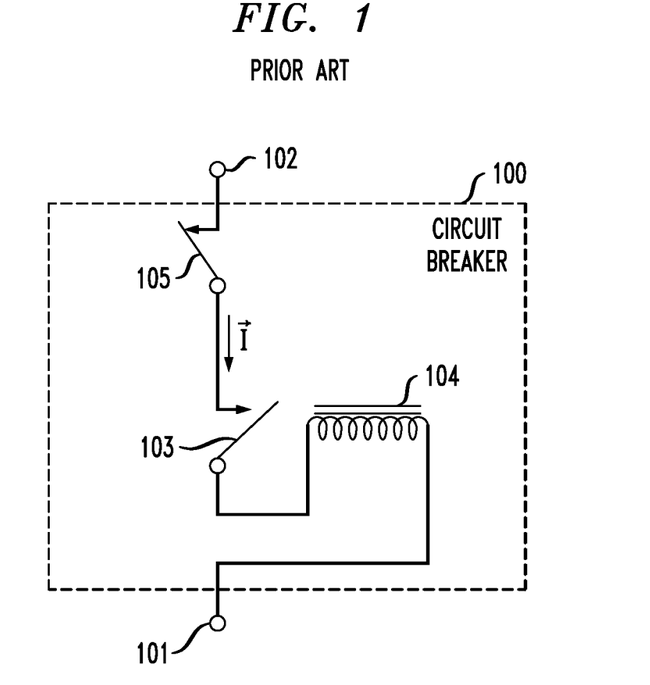
FIG. 1 depicts a schematic diagram of the salient components of a circuit breaker 100 in accordance with the prior art.

FIG. 1 depicts a schematic diagram of the salient components of circuit breaker 100 in accordance with the prior art. Circuit breaker 100 comprises: terminal 101, terminal 102, first switch 103, electromagnet 104, and second switch 105, interconnected in series.

First switch 103 is a single-pole, single-throw relay switch that is opened by electromagnet 104 when the current I flowing through electromagnet 104 exceeds a threshold current $I_T$ (i.e., $I > I_T$). When the threshold current through electromagnet 104 exceeds the threshold current, electromagnet 104 opens first switch 103, which prevents all current from flowing through circuit breaker 100. This protects the circuit and prevents a fire.

Second switch 105 is a single-pole, single-throw thermally-activated switch (e.g., a bi-metallic strip, etc.) that bends and opens when the current I flowing through electromagnet 104 exceeds the threshold current $I_T$. When the current through second switch 105 exceeds the threshold current, second switch 104 opens, which prevents all current from flowing through circuit breaker 100. This protects the circuit and prevents a fire.

First switch 103 and electromagnet 104 are designed to protect the circuit from sudden increases in current (i.e., current "spikes"), which might be caused, for example, when an electrical appliance is dropped into water. In contrast, second switch 105 is designed to protect the circuit from slowly-changing, but also dangerous increases in current, which might be caused, for example, when an electrical appliance awakes from sleep mode (i.e., an electric heater controlled by a thermostat).

Switch 103 and 105 can be combined into a single switch that can be acted on by an electromagnet, and can also be activated thermally.

One advantage of a circuit breaker over a fuse is that the circuit breaker can be re-used after it trips and is reset. One disadvantage of a circuit breaker over a fuse is that the circuit breaker is more expensive.

SUMMARY OF THE INVENTION

The present invention is a circuit breaker that avoids some of the maintenance costs and disadvantages associated with the circuit breakers in the prior art. For example, the illustrative embodiment of the present invention is a circuit breakers that:
  i. opens (i.e., "trips") and indicates that it has tripped when the current exceeds a tripping threshold $I_T$; and also
  ii. indicates when the current exceeds, or has exceeded, a warning threshold $I_W$.

This indicator is advantageous because it provides notice of a potential problem that can be addressed before it occurs.

The illustrative embodiment of the present invention comprises: a switch that carries a current I; an indicator for alternatively indicating: (i) that the current I has not exceeded $I_W$, and (ii) that the current I has exceeded $I_W$; and an actuator in series with the switch that: (i) causes the indicator to indicate that the current I has exceeded $I_W$ when and only when the current I has exceeded $I_W$, and (ii) opens the switch when and only when the current I exceeds $I_T$; wherein $0 < I_W < I_T$.

DETAILED DESCRIPTION

FIGS. 2a, 2b, 2c, 2d, and 2e depict schematic diagrams of the salient components of circuit breaker 200 in accordance with the illustrative embodiment of the present invention. Circuit breaker 200 has three mutually-exclusive states:
  (1) State #1 or the "Normal" state exists after circuit breaker 200 has been reset and the current I through the switch has not exceeded a warning-current threshold $I_W$ since the reset. Circuit breaker 200 exhibits nearly zero impedance between its terminals while in the Normal state.
  (2) State #2 or the "Warning" state exists after circuit breaker 200 has been reset and the current I through the switch has exceeded the warning-current threshold $I_W$ since the reset. Circuit breaker 200 exhibits nearly zero impedance between its terminals while in the Warning state.

(3) State #3 or the "Tripped" state exists after circuit breaker 200 has been reset and the current I through the switch has exceeded a tripped-current threshold $I_T$, since the reset, wherein $0<I_W<I_T$. Circuit breaker 200 exhibits high impedance between its terminals while in the Tripped state.

Figure 2A:
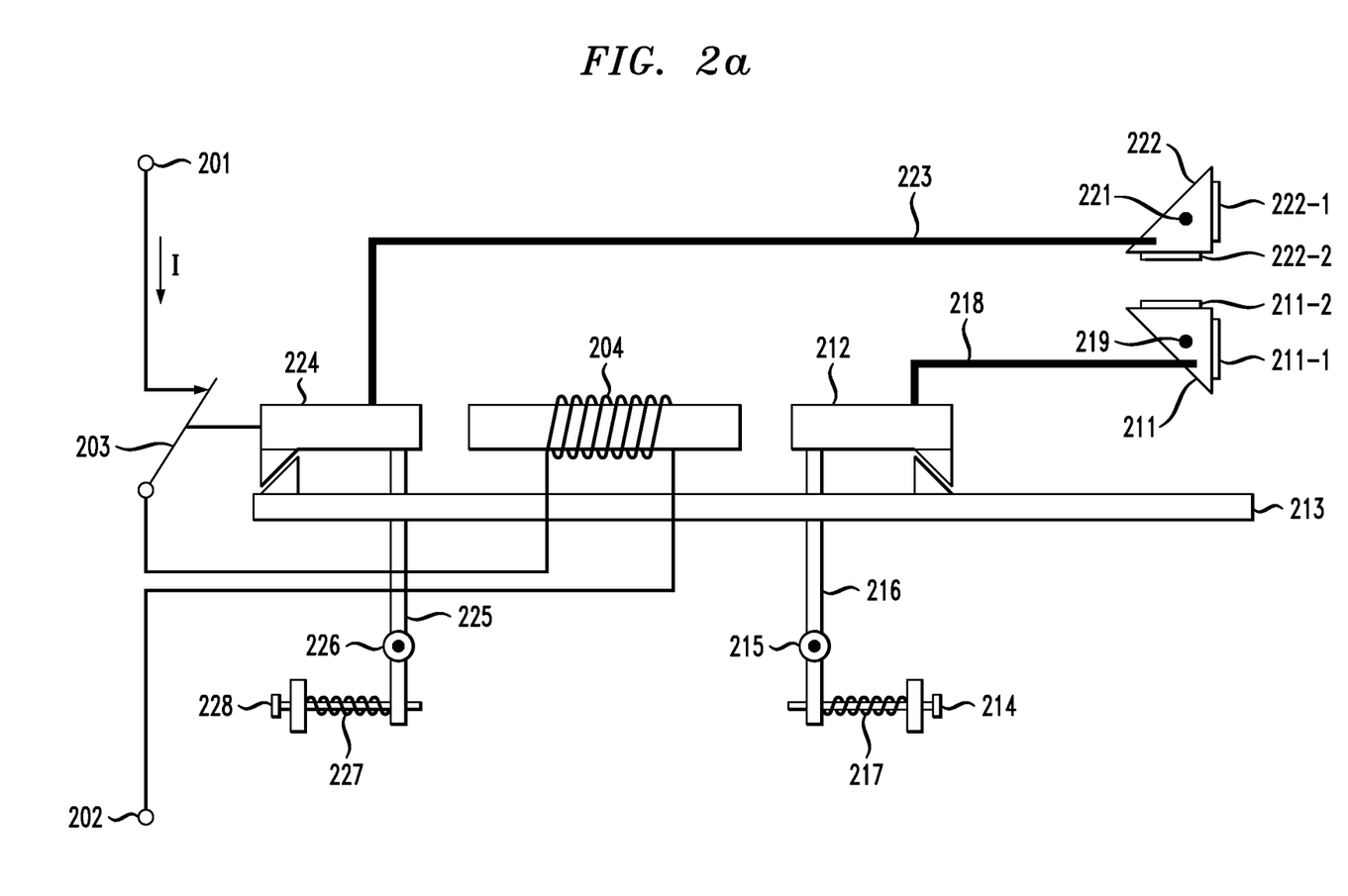
FIG. 2a depicts a schematic diagram of the salient components of a circuit breaker 200 in accordance with the illustrative embodiment of the present invention.
Figure 2B:
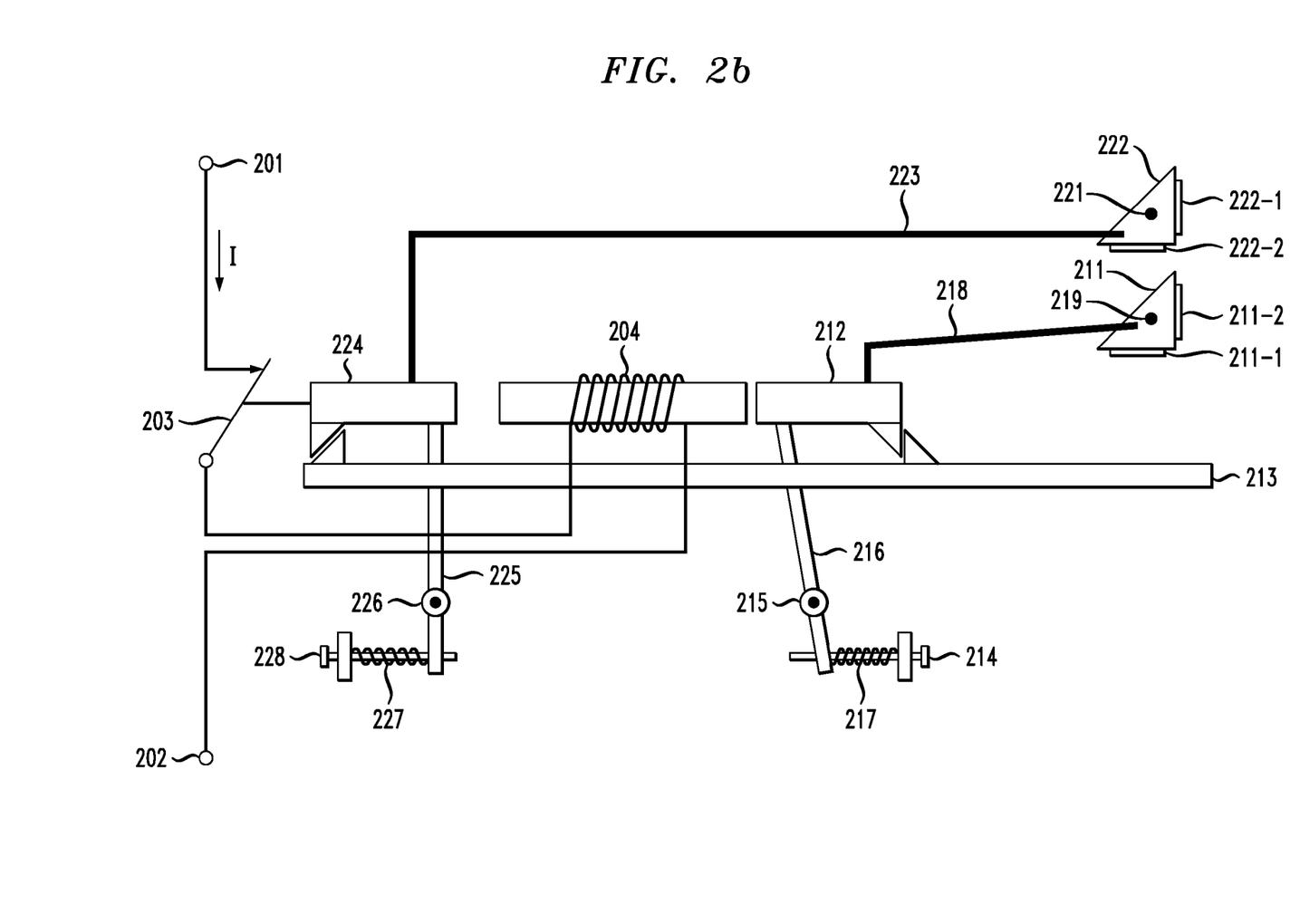
FIG. 2b depicts a schematic diagram of the salient components of circuit breaker 200 that comprises an indicator-element 211 for indicating that the current I through circuit breaker 200 has exceeded $I_W$, in accordance with the illustrative embodiment of the present invention.
Figure 2C:
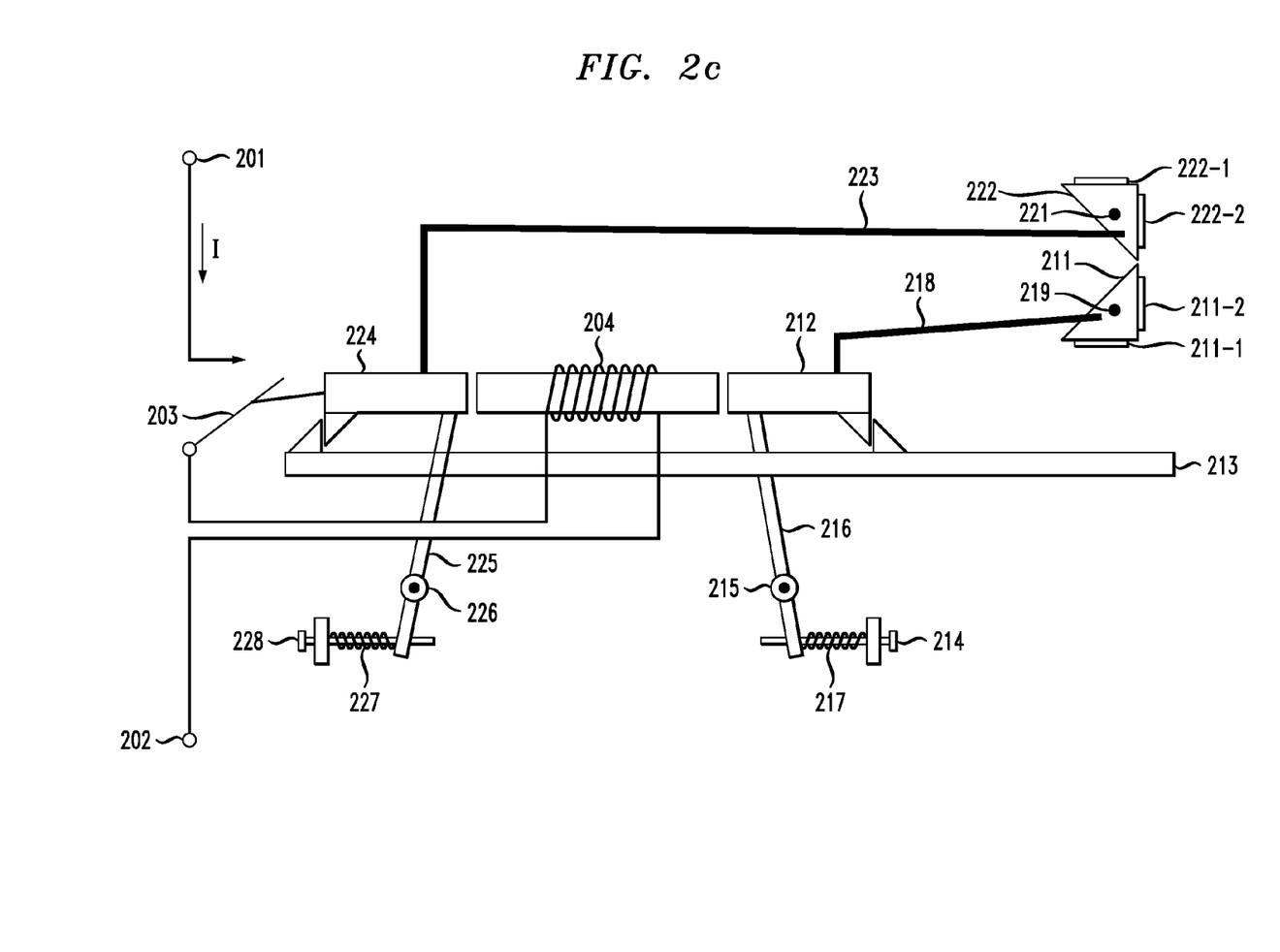
FIG. 2c depicts a schematic diagram of the salient components of circuit breaker 200 that comprises an electromagnet 204 for opening circuit breaker 200 when the current I through the electromagnet 204 exceeds $I_T$, in accordance with the illustrative embodiment of the present invention.
Figure 2D:
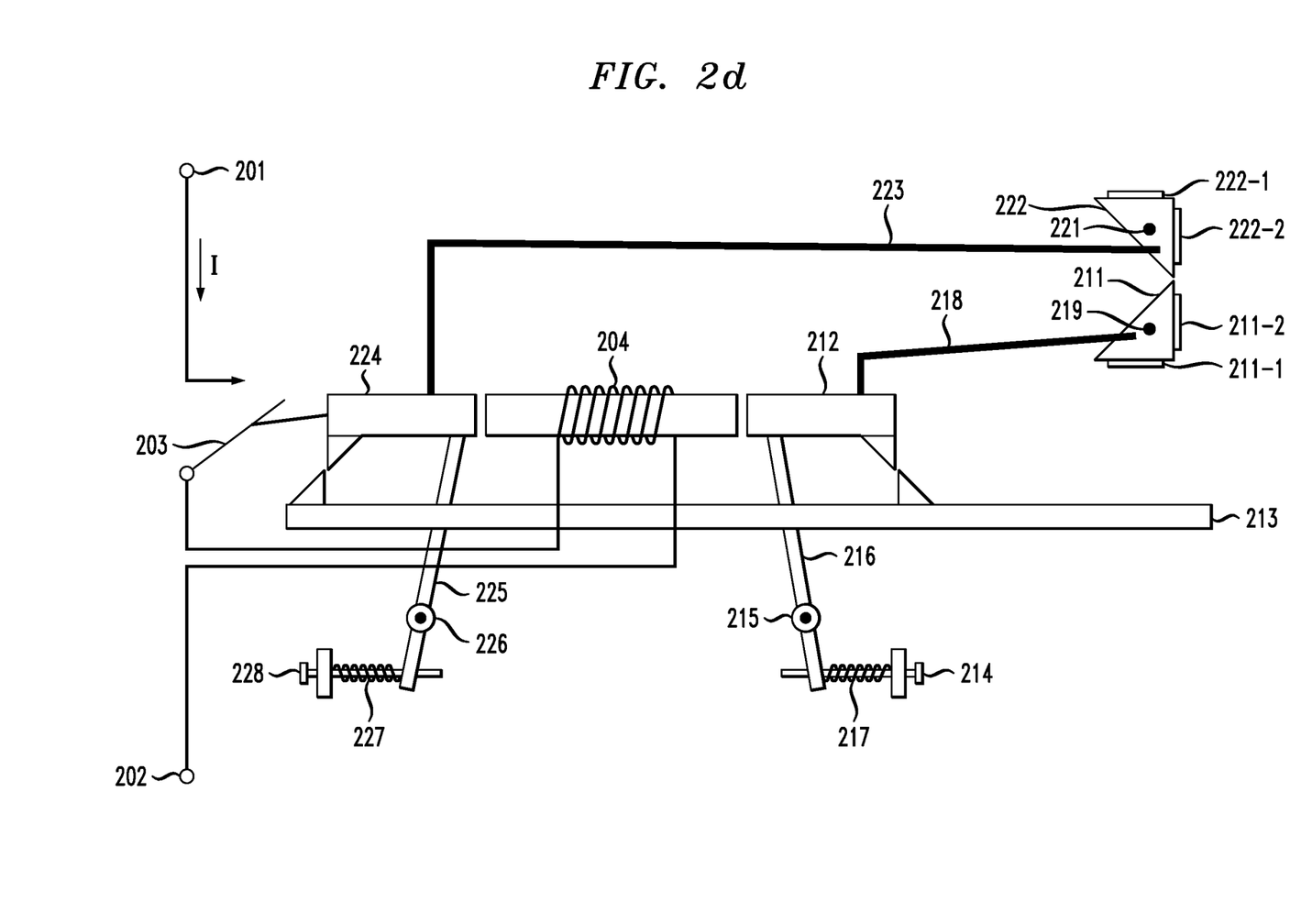
FIG. 2d depicts a schematic diagram of the salient components of circuit breaker 200 that comprises a reset mechanism 213 that resets both indicators and allows the circuit breaker 200 to close.
Figure 2E:
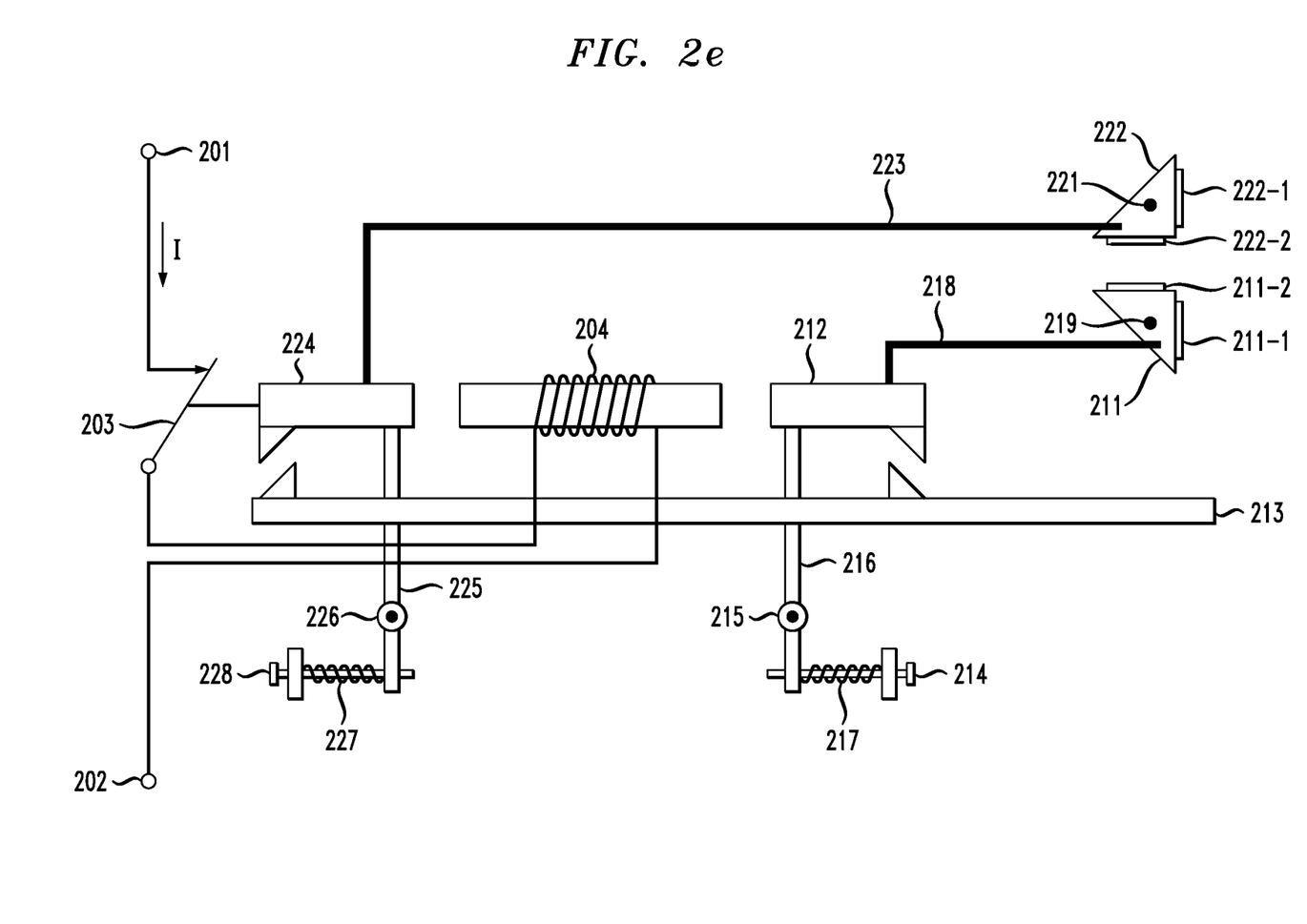
FIG. 2e depicts a schematic diagram of the salient components of circuit breaker 200 that comprises a reset mechanism 213 that resets both indicators and allows the circuit breaker 200 to close.

FIG. 2a depicts circuit breaker 200 in the Normal state; FIG. 2b depicts circuit breaker 200 in the Warning state, and FIG. 2c depicts circuit breaker 200 in the Tripped state. FIGS. 2d and 2e depict circuit breaker 200 during the transition from the Tripped state to the Normal state (i.e., while it is being reset).

Circuit breaker 200 comprises: terminal 201, terminal 202, relay switch 203, electromagnet 204, indicator-element 211, catch 212, reset 213, adjuster 214, axel 215, lever 216, spring 217, pull rod 218, axel 219, axel 221, indicator-element 222, push rod 223, catch 224, lever 225, axel 226, spring 227, and adjuster 228, interconnected as shown.

Although the illustrative embodiment of the present invention comprises two indicators 211 and 222, it will be clear to those skilled in the art, after reading this disclosure, how to make and use alternative embodiments of the present invention that comprises any number of indicators (e.g., one indicators, three indicators, four indicators, etc.).

Although the illustrative embodiment of the present invention comprises one reset 213 for both switch 203 and for indicator-element 211, it will be clear to those skilled in the art, after reading this disclosure, how to make and use alternative embodiments of the present invention that comprise a separate reset for each.

Relay switch 203 is a single-pole, single-throw (SPST) switch that opened by electromagnet 204 and closed by reset 213. It will be clear to those skilled in the art, after reading this disclosure, how to make and use alternative embodiments of the present invention in which relay switch 203 is in series with a thermally-activated switch (e.g., a bi-metallic strip, etc.), such as switch 105 in the prior art. Furthermore, it will be clear to those skilled in the art, after reading this disclosure, how to make and use alternative embodiments of the present invention in which relay switch 203 is:
 i. a single-pole, double-throw (SPDT) switch, or
 ii. a single-pole, triple-throw (SPTT) switch, or
 iii. a double-pole, single-throw (DPST) switch, or
 iv. a double-pole, double-throw (DPST) switch, or
 v. a double-pole, centre-off (DPCO) switch.

Electromagnet 204 is an actuator in series with relay switch 203 that:
 i. does not attract catch 212 with sufficient force to change indicator-element 211 to indicate a warning when the current I has not exceeded $I_W$, and
 i. attracts catch 212 with sufficient force to change indicator-element 211 to indicate a warning when the current I has exceeded $I_W$, and
 iii. does not attract catch 224 and leaves relay switch 203 closed when the current I through circuit breaker 200 does not exceed $I_T$, and
 iv. attracts catch 224 with sufficient force to open relay switch 203 and change indicator-element 222 to indicate an open breaker when the current I through circuit breaker 200 exceeds $I_T$, wherein $0<I_W<I_T$.

It will be clear to those skilled in the art, after reading this disclosure, how to make and use alternative embodiments of the present invention in which catch 212 is attracted by a different actuator (e.g., a second electromagnet, a bi-metallic switch, a temperature sensor, etc.) than electromagnet 204.

It will be clear to those skilled in the art, after reading this disclosure, how to make and use alternative embodiments of the present invention in which catch 224 and relay switch 203 are attracted by a different actuator (e.g. a second electromagnet, a bi-metallic switch, a temperature sensor, etc) than electromagnet 204.

Indicator-element 211 and indicator-element 222 together comprise an indicator that displays the state of circuit breaker 200.

Indicator-element 211 is a two-state mechanical indicator that has a geometric shape of a triangular prism. Indicator-element 211 rotates on axel 219 and comprises two faces—black or "normal" face 211-1 and yellow or "warning" face 211-2. The rotation of indicator-element 211—and thus the face that is exposed—is governed by pull rod 218, catch 212, reset 213, and electromagnet 204.

Face 211-1 is displayed when circuit breaker 200 is in the "Normal" state, face 211-2 is displayed when circuit breaker 200 is in the "Warning" state. Face 211-1 exhibits a black circle, face 211-2 exhibits a yellow circle.

It will be clear to those skilled in the art, after reading this disclosure, how to make and use alternative embodiments of the present invention in which the indicator-element 211 is something else and comprises, for example, and without limitation:
 i. one or more light-emitting diodes (LED), or
 ii. one or more liquid crystal displays (LCD), or
 iii. one or more different words, symbols, shapes, or colors, or
 iv. a transmitter that transmits a signal to a terminal that is remotely located from circuit breaker 200, or
 v. any combination of i, ii, iii, and iv.

Catch 212 comprises ferromagnetic material that is attracted to electromagnet 204 on one side and is connected to indicator-element 211 on the other via pull rod 218. Catch 212 engages the tooth of the ratchet in reset 213 depending on how far it is pulled by electromagnet 204. FIG. 2a depicts the relationship of catch 212 and reset 213 in the Normal state, FIG. 2b depicts the relationship of catch 212 and reset 213 in the Warning state.

Indicator-element 222 is a two-state mechanical indicator that has a geometric shape of a triangular prism. Indicator-element 222 rotates on axel 221 and comprises two faces—black or "normal" face 222-1 and red or "tripped" face 222-2. The rotation of indicator-element 222—and thus the face that is exposed—is governed by push rod 223, catch 224, reset 213, electromagnet 204, and relay switch 203.

Face 222-1 is displayed when circuit breaker 200 is in the "Normal" state, face 222-2 is displayed when circuit breaker 200 is in the "Tripped" state. Face 211-1 exhibits a black circle, face 222-2 exhibits a red circle.

It will be clear to those skilled in the art, after reading this disclosure, how to make and use alternative embodiments of the present invention in which the indicator-element 222 is something else and comprises, for example, and without limitation:
 i. one or more light-emitting diodes (LED), or
 ii. one or more liquid crystal displays (LCD), or
 iii. one or more different words, symbols, shapes, or colors, or
 iv. a transmitter that transmits a signal to a terminal that is remotely located from circuit breaker 200, or
 v. any combination of i, ii, iii, and iv.

It will be clear to those skilled in the art, after reading this disclosure, how to combine the functions of indicators 211 and 222 into a single indicator element that can display which one of the 3 states—normal, warning, and tripped—circuit breaker 200 is in.

Catch 224 comprises ferromagnetic material that is attracted to electromagnet 204 on one side and is connected to indicator-element 222 via push rod 223. Catch 224 engages the tooth of the ratchet in reset 213 depending on how far it is pulled by electromagnet 204. FIGS. 2a and 2b depicts the relationship of catch 224 and reset 213 in the Normal state, FIG. 2c depicts the relationship of catch 224 and reset 213 in the Tripped state. Catch 224 is linked to relay switch 203 so that if switch 203 is tripped through a mechanism other than through the magnetic action of electromagnet 204, such as a bimetal strip or other thermo-sensor, the catch 224 will be moved to catch the ratchet on reset 213. Catch 224 rotates indicator-element 222 through the action of push rod 223. Catch 224 and the ratchet on reset 223 prevents the circuit breaker relay switch 203 from re-closing until circuit breaker 200 is reset.

Reset 213 is a rod with a pair of ratchets that engage catches 212 and 224. The rod is pressed against the catches 212 and 224 with one or more light springs. In accordance with the illustrative embodiment, reset 213 comprises two teeth, and, therefore, the combination of catch 212, catch 224, and reset 213 can assume any one of four possible states. It will be clear to those skilled in the art, after reading this disclosure, how to make and use alternative embodiments of the present invention in which reset 213 comprises any number of ratchet teeth (e.g., three teeth, four teeth, five teeth, etc.) which would enable circuit breaker 200 to assume more states. This would be advantageous to enable circuit breaker to detect and display more warning states (e.g., a "low" warning state and a "high" warning state, etc.) It will be clear to those skilled in the art, after reading this disclosure, how to make and use alternative embodiments of the reset mechanism that employ independent resets for the early warning indicator, and for the trip indicator.

Adjuster 214 is a threaded bolt which, with spring 217, moderates the tension on catch 212 through the action of lever 216 which opposes the force of electromagnet 204 on catch 212. By adjusting 214, the tension on catch 212 can be changed, changing the effective value of $I_W$. In accordance with the illustrative embodiment, the force exerted by the adjuster 214 on lever 216 can be set by rotating the warning threshold current adjuster 214 clockwise or counter-clockwise to increase $I_W$ or decrease $I_W$, respectively.

Adjuster 228 is a threaded bolt which, with spring 227, moderates the tension on catch 224 through the action of lever 225 which opposes the force of electromagnet 204 on catch 224. By adjusting 228, the tension on catch 224 can be changed, changing the effective value of $I_T$. In accordance with the illustrative embodiment, the force exerted by the adjuster 228 on lever 225 can be set by rotating the warning threshold current adjuster 228 clockwise or counter-clockwise to increase $I_T$ or decrease $I_T$, respectively.

It will be clear to those skilled in the art, after reading this disclosure, how to make and use alternative embodiments of the present invention in which to either adjuster 214 or adjuster 228 or both are manufactured with electrical components.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A circuit breaker for regulating the current I flowing between a first terminal and a second terminal, the circuit breaker comprising:
   a switch that when closed carries a current I from the first terminal to the second terminal;
   a first indicator-element for alternatively indicating:
   (i) that the current I has not exceeded $I_W$ since the circuit breaker was last reset, or
   (ii) that the current I has exceeded $I_W$ since the circuit breaker was last reset;
   a second indicator-element for alternatively indicating:
   (i) that the current I has not exceeded $I_T$ since the circuit breaker was last reset, or
   (ii) that the current I has exceeded $I_T$ since the circuit breaker was last reset; and
   an actuator that:
   (i) causes the first indicator-element to indicate that the current I has exceeded $I_W$ since the circuit breaker was last reset when and only when the current I has exceeded $I_W$ since the circuit breaker was last reset,
   (ii) causes the second indicator-element to indicate that the current I has exceeded $I_T$ since the circuit breaker was last reset when and only when the current I has exceeded $I_T$ since the circuit breaker was last reset, and
   (iii) opens the switch when and only when the current I exceeds $I_T$ since the circuit breaker was last reset;
   wherein $0 < I_W \leq I_T$.

2. The circuit breaker of claim 1 further comprising a reset that:
   (i) causes the first indicator-element to indicate that the current I has not exceeded $I_W$ since the circuit breaker was last reset, and
   (ii) causes the second indicator-element to indicate that the current I has not exceeded $I_T$ since the circuit breaker was last reset, and
   (iii) closes the switch.

3. The circuit breaker of claim 1 wherein the actuator comprises an electromagnet in series with the switch.

4. The circuit breaker of claim 1 wherein the actuator comprises a thermally-activated switch in series with the switch.

5. The circuit breaker of claim 1 further comprising an adjuster for adjusting $I_W$, wherein $I_W$ is adjusted by rotating the adjuster.

6. A circuit breaker for regulating the current I flowing between a first terminal and a second terminal, the circuit breaker comprising:
   a switch that when closed carries a current I from the first terminal to the second terminal;
   a first indicator-element that comprises two mutually-exclusive states:
   (i) a normal state, and
   (ii) a warning state;
   a second indicator-element that comprises two mutually-exclusive states:
   (i) a normal state, and
   (ii) a tripped state; and
   an actuator that:
   (i) transitions the first indicator-element from the normal state to the warning state when and only when I exceeds $I_W$,
   (ii) transitions the second indicator-element from the normal state to the tripped state when and only when I exceeds $I_T$, and (iii) opens the switch when and only when I exceeds $I_T$ since the circuit breaker was last reset;
wherein $0<I_W<I_T$.

7. The circuit breaker of claim 6 further comprising a reset that when activated:
   (i) transitions the first indicator-element to the normal state,
   (ii) transitions the second indicator-element to the normal state, and
   (iii) closes the switch.

8. The circuit breaker of claim 6 wherein the actuator comprises an electromagnet in series with the switch.

9. The circuit breaker of claim 6 wherein the actuator comprises a thermally-activated switch in series with the switch.

10. The circuit breaker of claim 6 further comprising an adjuster for adjusting $I_W$, wherein $I_W$ can be adjusted from the outside of the circuit breaker.

11. A circuit breaker for regulating the current I flowing between a first terminal and a second terminal, the circuit breaker comprising:
    a switch that when closed carries a current I from the first terminal to the second terminal;
    an indicator capable of indicating:
      (i) that the current I has not exceeded $I_W$ since the circuit breaker was last reset,
      (ii) that the current I has exceeded $I_W$ since the circuit breaker was last reset, and
      (iii) that the current I has exceeded $I_T$ since the circuit breaker was last reset; and
    an actuator that:
      (i) causes the indicator to indicate that the current I has exceeded $I_W$ since the circuit breaker was last reset when and only when the current I has exceeded $I_W$ since the circuit breaker was last reset,
      (ii) causes the indicator to indicate that the current I has exceeded $I_T$ since the circuit breaker was last reset when and only when the current I has exceeded $I_T$ since the circuit breaker was last reset, and
      (iii) opens the switch when and only when the current I exceeds $I_T$ since the circuit breaker was last reset;
    wherein $0<I_W<I_T$.

12. The circuit breaker of claim 11 further comprising a reset that:
    (i) causes the first indicator-element to indicate that the current I has not exceeded $I_W$ since the circuit breaker was last reset, and
    (ii) causes the second indicator-element to indicate that the current I has not exceeded $I_T$ since the circuit breaker was last reset, and
    (iii) closes the switch.

13. The circuit breaker of claim 11 wherein the actuator comprises an electromagnet in series with the switch.

14. The circuit breaker of claim 11 wherein the actuator comprises a thermally-activated switch in series with the switch.

15. The circuit breaker of claim 11 further comprising an adjuster for adjusting $I_W$, wherein $I_W$ can be adjusted from the outside of the circuit breaker.

16. A circuit breaker for regulating the current I flowing between a first terminal and a second terminal, the circuit breaker comprising:
    a switch that when closed carries a current I from the first terminal to the second terminal;
    an indicator that comprises:
      (i) a normal state,
      (ii) a warning state, and
      (ii) a tripped state; and
    an actuator that:
      (i) transitions the indicator from the normal state to the warning state when I exceeds $I_W$,
      (ii) transitions the indicator to the tripped state when and only when I exceeds $I_T$,
      (iii) opens the switch when and only when I exceeds $I_T$ since the circuit breaker was last reset;
    wherein $0<I_W<I_T$.

17. The circuit breaker of claim 16 further comprising a reset that when activated:
    (i) transitions the first indicator-element to the normal state, and
    (ii) closes the switch.

18. The circuit breaker of claim 16 wherein the actuator comprises an electromagnet in series with the switch.

19. The circuit breaker of claim 16 wherein the actuator comprises a thermally-activated switch in series with the switch.

20. The circuit breaker of claim 16 further comprising an adjuster for adjusting $I_W$, wherein $I_W$ is adjusted by rotating the adjuster.

* * * * *